W. WORKMAN.
Seeding Machine.
No. 3,913. Reissued April 12, 1870.
Fig: 1.
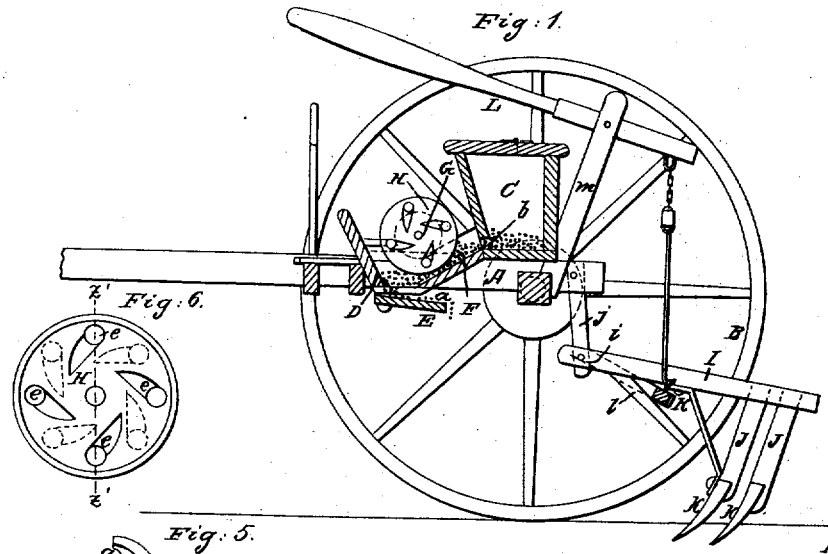
Fig: 4.
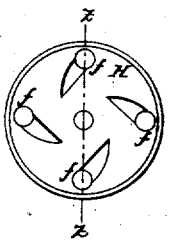
Fig: 6.
Fig: 5.
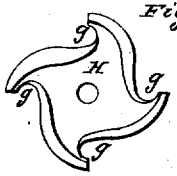
Fig: 3.
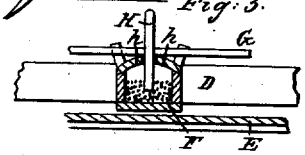
Fig: 2.
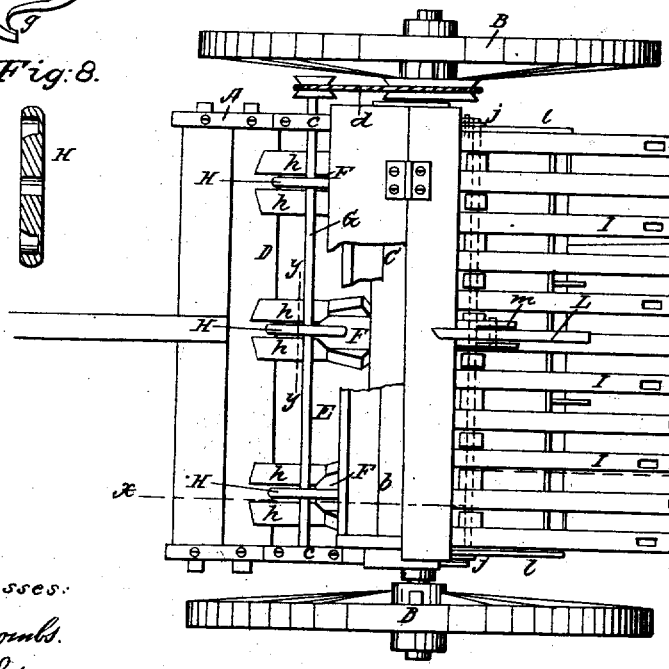
Fig: 8.
Fig: 7.
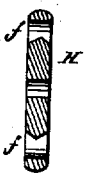
Witnesses:
J. W. Coombs.
R. S. Spencer.
Inventor:
W. Workman.
per Munn & Co.
attys.
N. PETERS, Photo-Lithographer, Washington, D. C.

UNITED STATES PATENT OFFICE.

FREDERICK H. MANNY, OF ROCKFORD, ILLINOIS, ASSIGNEE OF WILLIAM WORKMAN.

IMPROVEMENT IN SEEDING-MACHINES.

Specification forming part of Letters Patent No. 28,934, dated June 26, 1860; Reissue No. 3,913, dated April 12, 1870.

*To all whom it may concern:*

Be it known that WILLIAM WORKMAN has invented a new and useful Improvement in Seeding-Machines; and it is hereby declared that the following is a full and exact description of the same, reference being had to the accompanying drawings, and to the letters of reference marked thereon.

This invention relates to that class of seeding-machines which employ seed-wheels so constructed as to lift the grain or seed to be raised from the hopper and by their revolution deliver the same to the discharging boards or spouts; and it consists, first, in the construction of the seed-wheels, and second, in the general construction and arrangement of the parts as a whole.

In the drawings, Figure 1 is a side sectional elevation of the invention, taken in the line *x x*, Fig. 2. Fig. 2 is a plan view of the same. Fig. 3 is a detached transverse section of a portion of the same, taken in the line *y y*, Fig. 2. Figs. 4, 5, and 6 are detached views of seed-distributing wheels; and Figs. 7 and 8 are sections of Figs. 4 and 6, taken, respectively, in the lines *z z*, *z′ z′*.

To enable others skilled in the art to make and use this invention, I will now proceed to describe fully its construction and operation.

A is a horizontal frame, which is mounted on two wheels, B B.

C is a seed-box, which is placed on the back part of frame A, the top of which serves as a seat for the driver.

Directly in front of the seed-box C there is a trough, D, the bottom E of which is inclined, and which has also an opening, *a*, left at its back for the escape of the seed, which opening extends the whole length of the trough.

Within the trough D there are placed three or more seed boxes or hoppers, F, which communicate with the main or principal seed-box C by means of openings *b*.

G is a shaft, which is fitted in proper bearings, *c*, on the frame A, and extends longitudinally over the trough D. This shaft is rotated by a belt, *d*, from the hub of one of the wheels B.

On this shaft G are placed the seed-distributing wheels H, one being located on each of the hoppers F. The wheels H may be constructed in any suitable way, and cells *e* may be formed in the sides of the wheels, near their peripheries, as shown in Figs. 6 and 8; or openings *f* may be made entirely through the wheels, as shown in Figs. 4 and 7; or wheels with scoop-shaped arms *g* may be employed, as shown in Fig. 5. The feature considered of especial importance in the construction of these wheels is the employment of outwardly-inclined discharging-edges, in connection with cups or cells for taking up the seed.

On the top of each hopper F there are two inclined planes, *h h*, inclined in reverse directions, and one placed at each side of the wheels, as shown more particularly in Fig. 3.

To the back end of the frame A a rod, *i*, is attached by pendent bars *j j*, and on this rod *i* a series of bars, I, are placed loosely. Each bar I has a foot, J, attached to its back part, at or nearly at right angles, and to each foot a cultivator tooth or share, K, is secured.

On the ends of the rod *i* arms *l l* are fitted loosely, and to the outer end of these arms a bar, K, is attached, said bar being connected to a lever, L, the fulcrum of which is in a support, *m*, attached to the seed box or hopper C. The bars I, and consequently the cultivator-teeth K, extend the whole length of the trough D.

The operation is as follows: As the machine is drawn along, the seed pours from the seed box or hopper C through the openings *b* into the hoppers F, from which it is raised by the wheels H, the shaft of the latter being rotated by belt *d*. The seed drops from the wheels H on the inclined planes *h h*, and thence on the inclined scatterer or bottom board, E, of the trough D, and escapes through the opening *a*, falling in a scattered state on the ground, and is covered by the teeth K. The teeth K may be elevated above the ground at any time, in order that they may pass over obstructions, or, for convenience in turning, by depressing the front end of lever L, which may be done by the driver in his seat.

Having thus fully described the invention, what is claimed as new, and desired to be secured by Letters Patent, is—

1. The combination, in a seed-wheel, of cups or cells and outwardly-inclined discharging-edges, when the cups or cells are arranged in or near the periphery, and the inclined edges are used on one or both sides, substantially as described.

2. The combination of the principal seed-box C and supplemental seed-boxes F, the latter being provided with the inclined planes *h* *h* and wheels H, and fitted in the trough D, having the inclined bottom or scattering-board E, as described, for the purpose set forth.

FREDERICK H. MANNY.

Witnesses:
G. W. FORD,
JAS. H. MANNY.